United States Patent

Yamamoto

[11] Patent Number: 6,049,825
[45] Date of Patent: Apr. 11, 2000

[54] METHOD AND SYSTEM FOR SWITCHING BETWEEN DUPLICATED NETWORK INTERFACE ADAPTERS FOR HOST COMPUTER COMMUNICATIONS

[75] Inventor: Shinji Yamamoto, Kawasaki, Japan

[73] Assignee: Fujitsu Limited, Kawasaki, Japan

[21] Appl. No.: 08/990,738

[22] Filed: Dec. 15, 1997

[30] Foreign Application Priority Data

Mar. 19, 1997 [JP] Japan ................................. 9-066717

[51] Int. Cl.[7] .................................................. G06F 15/16
[52] U.S. Cl. ............................... 709/221; 709/220; 714/2
[58] Field of Search .................................. 709/224, 223,
709/238, 250, 249, 220, 221; 370/351,
401, 409; 714/2, 4.25; 710/17

[56] References Cited

U.S. PATENT DOCUMENTS

| | | | |
|---|---|---|---|
| 5,774,640 | 6/1998 | Kurio | 714/4 |
| 5,815,668 | 9/1998 | Hashimoto | 395/200.68 |
| 5,835,696 | 11/1998 | Hess | 395/182.08 |
| 5,963,540 | 10/1999 | Bhaskaran | 370/218 |
| 5,983,360 | 11/1999 | Ugajin | 714/11 |

Primary Examiner—Mehmet B. Geckil
Attorney, Agent, or Firm—Staas & Halsey

[57] ABSTRACT

A method and system for switching between duplicated network adapters in order to provide a host computer with fault-tolerant functionality for TCP/IP communication with a plurality of other hosts over a network. A first host is equipped with a first and second network adapters, which constructs a hot standby system. When a fault of the first network adapter has been detected, the first host disconnects the first network adapter and activates the second network adapter. The first host then initializes its own network table (or ARP cache) and initiates transmission of a control message addressed to the second host. This control message is an echo request message defined in the ICMP protocol. The second network adapter broadcasts an ARP request message to all hosts on the network. The second host replies to this ARP request message by returning an ARP response message. The second network adapter transmits the control message to the second host by using address information contained in the ARP response message. Upon receipt of a response message from the second host in reply to the control message, the first host recognizes it as the completion of the process of switching from the first network adapter to the second network adapter.

15 Claims, 8 Drawing Sheets

PRIOR ART

METHOD AND SYSTEM FOR SWITCHING BETWEEN DUPLICATED NETWORK INTERFACE ADAPTERS FOR HOST COMPUTER COMMUNICATIONS

BACKGROUND OF THE INVENTION

1. Field of the Invention

The present invention relates to a method and system for switching between duplicated network interface adapters attached to a host computer to provide fault-resilient network communication functions. More particularly, the present invention relates to a method and system for automatically switching between duplicated network interface adapters to achieve quick recovery from failure without disrupting ongoing host-to-host communications based on the Transmission Control Protocol/Internet Protocol (TCP/IP).

2. Description of the Related Art

The TCP/IP protocols are widely used in today's computer communications from local area networks to worldwide scale networks. There are some conventional network systems use TCP/IP to exchange data between a plurality of host computers. Each host is equipped with a network interface adapter (or network adapter for short) as one of its peripherals, coupled through a local channel or system bus, which serves as a hardware and software interface to provide the functionality of the TCP/IP protocol stack. In the case that high availability of communication functions is inevitable, as is in server systems, hardware duplication and backup techniques are introduced to the host design. More specifically, a host is equipped with two network adapters, one for main use and the other for backup, to provide the immediate readiness of an alternative functional unit to which operations can be automatically switched when the main adapter has failed. This structural arrangement is sometimes called a hot standby system, which greatly reduces unwanted machine downtime.

Figure 7:
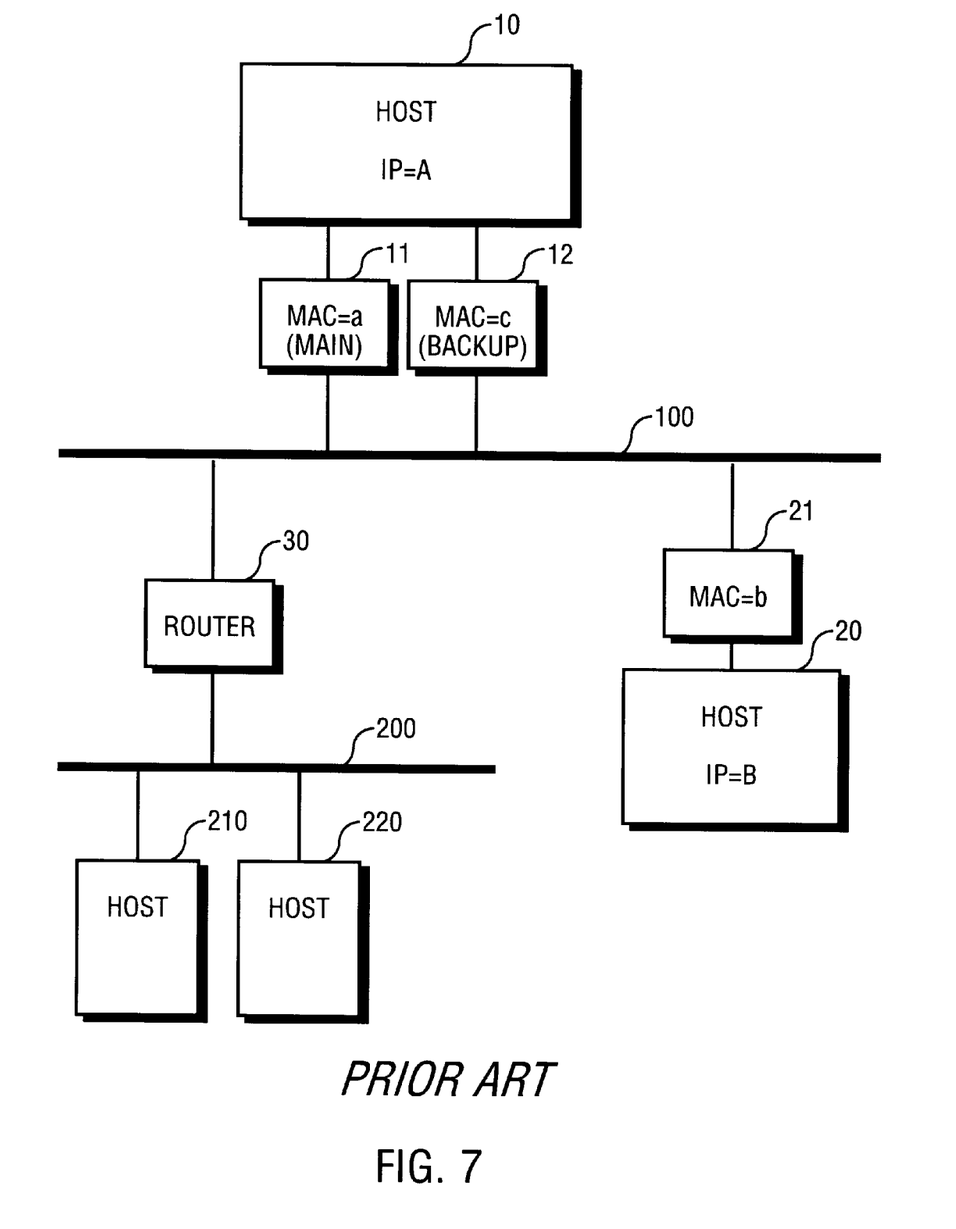
FIG. 7 is a diagram which shows the configuration of a conventional host-to-host communications system.

FIG. 7 is a diagram which shows the configuration of a conventional host-to-host communication system. A host 10 is connected to a local area network (LAN) 100 through duplex network adapters 11 and 12. Although both network adapters 11 and 12 are working concurrently as independent network entities, only one network adapter (e.g., network adapter 11) is allocated as an active resource for the host 10. The other network adapter 12 normally stays in standby mode, while monitoring the network activities. In addition to the host 10, another host 20 is connected to the LAN 100 through a network adapter 21. The LAN 100 is further linked to another LAN 200 via a router 30, and many computers 210, 220, etc. are connected to the LAN 200.

Those network nodes exchange data over the network by using the TCP/IP protocols. To this end, the devices are provided with different addresses so that they will be uniquely identified. For instance, different IP addresses "A" and "B" are set to the hosts 10 and 20, respectively, which are sometimes called "logical addresses."

While IP addresses are defined for use in the internet layer protocols as integral part of the TCP/IP protocol suite, the lower layer protocol (i.e., datalink) requires another kind of address information to deliver packets within a local portion of a network, or a subnet. Such network addresses are referred to as "MAC addresses," which are sometimes called "physical addresses" as opposed to the logical addresses. MAC addresses are assigned to individual network adapters which provide capabilities of lower-layer communication control. In the system of FIG. 7, for instance, MAC addresses "a" and "c" are given to the network adapters 11 and 12 of the host 10. Similarly, a MAC address "b" is assigned to the network adapter 21 of the host 20. The association between IP addresses and MAC addresses can be acquired by using the Address Resolution Protocol (ARP) as will be described later on. The hosts or network adapters individually maintain a list of IP addresses and the MAC addresses that correspond to them by monitoring ARP messages. This list is called a "network table," or "ARP cache."

Generally, in TCP/IP communications, a failure that has happened in a router device on a certain connection path between a specific source and destination nodes will initiate a process of finding an alternate route to reach the same destination after expiration of a predetermined time. Therefore, the hosts can continue communication by using another router available, through an alternative connection path that has been found.

Likewise, in the case that a fault is detected with the main network adapter of a certain host, the operations will be automatically switched to another network adapter prepared for backup. However, there exists such a problem with conventional systems that they are unable to switch from the main to the backup in an instant fashion. It actually takes a long time interval—twenty minutes, for example. The rest of this section will discuss the problem with conventional systems in detail.

Figure 8:
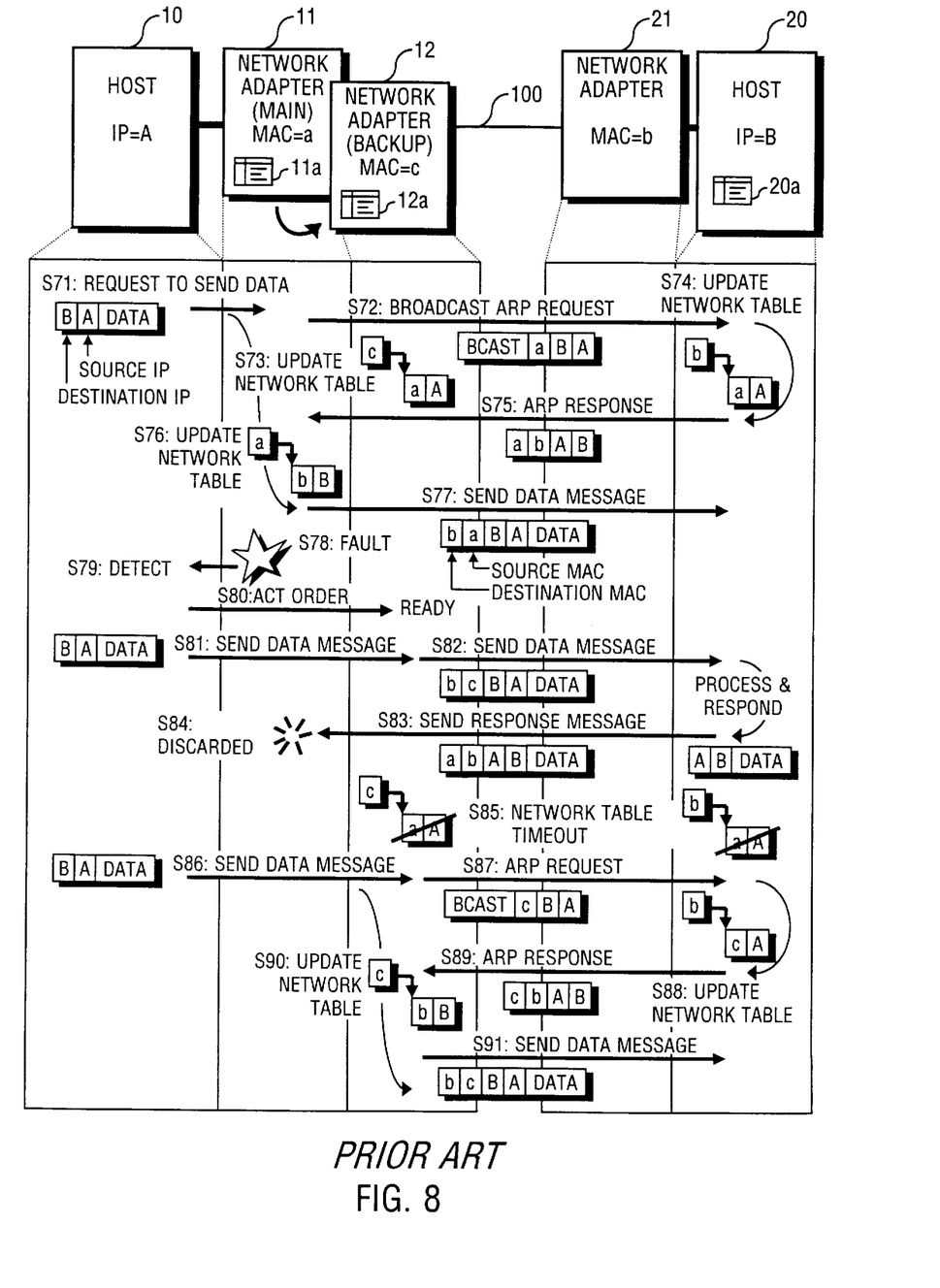
FIG. 8 is a sequence diagram which shows how to switch between duplicated network adapters in a conventional system.

Referring now to FIG. 8, the operation of the conventional communication system will be explained below. FIG. 8 is a sequence diagram which shows how to switch between duplicated network adapters in the conventional network system of FIG. 7. Hosts 10 and 20 communicate according to the following steps.

(S71) The host 10 requests the network adapter 11 to perform a data transmission to the host 20. More specifically, the following data message is passed to the network adapter 11.

"(B) (A) (DATA)"

Here, the first field "(B)" is a destination IP address, and the second field "(A)" is a source IP address. The third field is a payload, or the main body of the data message addressed to the host 20. Note here that the message format conventions used in this specification are much simplified for illustrative purposes, while the message structure in actual implementations should conform to the standard protocol specifications for TCP/IP.

(S72) If the destination MAC address "b" was known, the network adapter 11 could readily transmit the data message over the network after adding the MAC addresses to each packet header. At this initial stage, however, the network adapter 11 is unable to send the message at once because the MAC address corresponding to the destination IP address "B" is not registered in a network table 11a of the network adapter 11. Accordingly, the network adapter 11 suspends the transmission of that message for a while and, instead, transmits an ARP request message containing the following information to all nodes on the network to investigate the MAC address of the destination.

"(BCAST) (a) (B) (A)"

As mentioned earlier, ARP is the acronym of Address Resolution Protocol, which is used to ask every node on the network what the MAC address for a particular IP address is. Here, the first field "(BCAST)" represents a code used to call up all MAC addresses simultaneously, allowing the network adapter 11 to broadcast the same message toward every node on the network. The second field "(a)" indicates the source MAC address, i.e., the MAC address of the network adapter 11 that is currently activated. The third and fourth fields "(B)" and "(A)" represent the destination IP address and source IP address, respectively.

(S73) While being in a standby state (i.e., not serving the host 10), the backup network adapter 12 receives ARP broadcast messages and acquires information about network address mapping, if any. The network adapter 12 thus takes in the ARP request message of step S72, and enters the acquired information into its own network table 12a. More specifically, a new table entry for the correspondence between the IP address "A" and MAC address "a" is entered to the network table 12a. This entry is represented in such a form as (c|a:A), where the first term "c" means that the owner of the network table has a MAC address "c," and the second and third terms "a" and "A" separated by a colon represent a pair of MAC and IP addresses that have been received and registered. This convention of the network table entries is used throughout the present specification, although the accompanying drawings show them in more graphical form.

(S74) The ARP request message transmitted in step S72 now reaches the network adapter 21 and is passed to the host 20. The host 20 registers a new entry (b|a:A) to its own network table 20a, which represents a MAC address "a" associated with the IP address "A" of the host 10.

(S75) The host 20 recognizes that the ARP request message is destined for itself, and thus replies to the host 10 by returning an ARP response message via the network adapter 21.

(S76) The network adapter 11 receives the ARP response message transmitted from the host 20 in step S75. It then registers an entry (a|b:B) to its network table 11a, which shows the association between the MAC address "b" and IP address "B" of the host 20.

(S77) Now that the destination MAC address of the host 20 is available in the network table 11a, the network adapter 11 executes transmission of the data message that has been suspended since step S72. Here, the IP and MAC addresses are added to the message as follows.

"(b) (a) (B) (A) (DATA)", where the first field "(b)" shows the destination MAC address, the second field "(a)" the source MAC address, the third field "(B)" the destination IP address, the fourth field "(A)" the source IP address, and the fifth field "(DATA)" the transmission data.

(S78) It is assumed here that some trouble has happened to the main network adapter 11.

(S79) The host 10 detects the failure of the network adapter 11, and initiates a process of switching from the main network adapter 11 to the backup network adapter 12.

(S80) The host 10 sends an activation order to the network adapter 12 that has been in standby mode, thereby enabling the activated network adapter 12 to provide the host 10 with communication functions, in place of the main network adapter 11.

(S81) To send another data message to the host 20, the host 10 requests its transmission to the network adapter 12.

(S82) The network adapter 12 transmits the message supplied by the host 10, adding address information as follows.

"(b) (c) (B) (A) (DATA)"

(S83) In response to the message sent from the host 10, the host 20 performs some processes and reports the result status to the host 10. Because neither host 20 nor network adapter 21 is aware that the network adapter 1a has lost its functionality, the old table entry (b|a:A) still remains unchanged in the network table 20a in the host 20. This naturally causes the response message addressed to the host 10 to have a destination MAC address of "a" that points to the failed network adapter 11.

"(a) (b) (A) (B) (DATA)"

(S84) However, this message cannot reach the destination host 10 because the network adapter 11 is not operational due to the trouble. The response message sent from the host 20 will be discarded after all.

(S85) Such disruption of communication will continue until the relevant entry of the network table 20a in the host 20 is updated with a correct value. Unfortunately, however, the network table 20a will never be corrected unless ARP request/response messages pertaining to the host 10 are received.

On the other hand, the TCP/IP protocol standards require the network control software to nullify such a network table entry for a particular network address that exhibits no activity for a predetermined timeout period, which is typically twenty minutes. This simply means that the host 20 cannot communicate with the host 10 for twenty minutes after all. Only thing the hosts can do in such a situation is just to wait for the expiration of the 20-minute timeout. Upon timeout, the above-described mechanism is activated to nullify the invalid entries. The old entry pertaining to the failed network adapter 11's MAC address is now removed from the network table 20a, and the hosts 10 and 20 will be able to communicate with each other.

(S86) Suppose that the 20-minutes timeout period has expired, and the host 10 has another data message to send to the host 20. The network adapter 12 receives a transmission request from the host 10.

(S87) At this stage, the entry concerning the MAC address of the network adapter 21 cannot be found in the network table 12a. Therefore, the network adapter 12 transmits the following ARP request message in broadcast mode to obtain the destination MAC address.

"(BCAST)(c) (B) (A)"

(S88) The destination network adapter 21 receives the ARP broadcast and passes it to the host 20, thus allowing the IP and MAC addresses of the host 10 to be registered into the network table 20a. More specifically, a new entry (b|c:A) showing the association between the IP address "A" and MAC address "c" is entered to the network table 20a.

(S89) The host 20 returns an ARP response message via the network adapter 21 to inform the host 10 of the MAC address "b" in question.

(S90) The network adapter 12 receives this ARP response message and registers an entry (c|b:B) to its network table 12a.

(S91) The network adapter 12 transmits the data message that has been suspended since step S87 by setting its destination MAC and IP addresses as follows.

"(b) (c) (B) (A) (DATA) "

As described above, the conventional system cannot immediately remove the MAC address of the failed network adapter 11, once it is registered in the target host's network table 20a. Since the MAC address remains invalid until the expiration of 20-minute timeout in step S85, the host 20 is unable to send any messages to the network adapter 12 during this period. Although the hot-standby configuration allows the host 10 to detect errors in the main network adapter 11 and switch the operations to the backup network adapter 12, the communication is disrupted because of the inability to update network tables in other hosts. Some applications using connection-oriented protocols of TCP may produce timeout errors during the 20-minute absence of the communication, resulting in an interruption of the ongoing application processes.

As such, the host 10 cannot enjoy the advantages of duplex network adapter configurations since they do not work effectively at all in the conventional system structure.

SUMMARY OF THE INVENTION

Taking the above into consideration, an object of the present invention is to provide a method and system for automatically switching between duplicated network adapters to provide quick recovery from failure without disrupting ongoing host-to-host communications based on the TCP/IP protocol.

To accomplish the above object, according to the present invention, there is provided a method of switching from a first network adapter to a second network adapter to provide a first host with duplicated functionality for TCP/IP communications with a plurality of hosts including a second host over a network. According to this method, the first host disconnects the first network adapter and, instead, activates the second network adapter, when a fault of the first network adapter has been detected. The first host then initializes its own network table (or ARP cache), as well as initiating transmission of a control message to the second host. Preferably, this control message is an echo request message defined in the Internet Control Message Protocol (ICMP). The second network adapter broadcasts an ARP request message to the hosts on the network. The second host replies to this ARP request message by returning an ARP response message. The second network adapter transmits the control message to the second host by using address information contained in the ARP response message received from the second host, and it receives a response message from the second host in reply to the control message. The first host recognizes the reception of the response message as the completion of the switching process from the first network adapter to the second network adapter. Now that the first host has been recovered from the failure of network function, the first and second hosts can continue the communication. The above switching method is applicable to such systems where the first host provides communication protocols of transport layer, and the first and second network adapters provide communication protocols of internet and lower layers.

To accomplish the above object, according to the present invention, there is further provided a method of switching from a first network adapter to a second network adapter to provide a first host with duplicated functionality for TCP/IP communications with a plurality of other hosts including a second host over a network. According to this method, the host disconnects the first network adapter and, instead, activates the second network adapter, when a fault of the first network adapter has been detected. Subsequently, the first host sends an ARP response message to the second host via the second network adapter. Since this ARP response message includes the IP address of the host and the MAC address of the second network adapter, the second host can update its network table with new address information contained in the received ARP response message. This switching method is applicable to such systems where the first host provides communication protocols of internet layer, and the first and second network adapters provide communication protocols of network interface layer.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Referring now to FIGS. 1 to 6, three embodiments of the present invention will be described below.

Figure 1A:
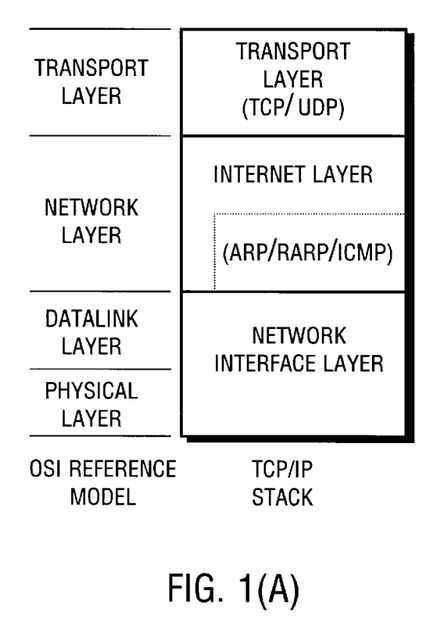
FIG. 1(A) is a diagram which shows the TCP/IP protocol stack in comparison with the ISO Reference Model for Open System Interconnection.
Figure 1B:
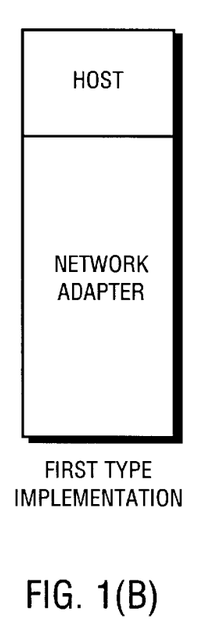
FIG. 1(B) is a diagram which shows the hierarchical structure of protocol functions shared by a host and a network adapter in a first embodiment of the present invention.
Figure 1C:
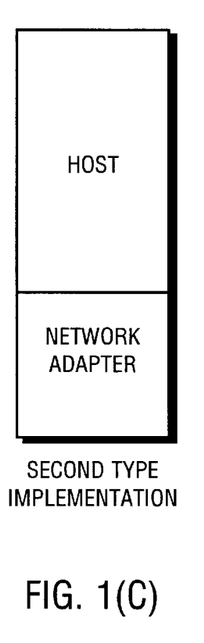
FIG. 1(C) is a diagram which shows the hierarchical structure of protocol functions shared by a host and a network adapter in a second embodiment of the present invention.

First, the structure of the communication protocols used in the embodiment of the present invention will be described. FIGS. 1(A) to 1(C) are diagrams depicting the TCP/IP protocol stack and the hierarchical structure of protocol functions shared by a host and a network adapter in the present invention.

More particularly, FIG. 1(A) shows the functional hierarchy of the TCP/IP protocol stack in comparison with the ISO Reference Model for Open System Interconnection (OSI reference model for short). The lowest layer is called the network interface layer, which corresponds to the physical and datalink layers in the OSI Reference Model. The next layer is called the internet layer (or IP layer), which corresponds to the network layer in the OSI reference model. The third layer is referred to as the transport layer (same in the OSI reference model), which provides network communication services to upper-layer applications (not shown in FIG. 1).

In the network interface layer, the source and destination of each packet must be specified by Media Access Control (MAC) addresses. The protocol used in the internet layer is called the IP protocol, which gives source and destination IP addresses to the header of a message when it is transmitted. Regarding the IP addresses, there is provided a mechanism for network nodes to determine each other's MAC addresses from their IP addresses. This mechanism is known as the Address Resolution Protocol (ARP). There is also provided an address resolution mechanism in the opposite direction, i.e., from MAC to IP, which is called the Reverse Address Resolution Protocol (RARP). Further, the internet layer protocols include the Internet Control Message Protocol (ICMP), which allows a node to test the connectivity of a particular node and/or report some unusual events to other nodes. The transport layer protocols include the Transmission Control Protocol (TCP) and the User Datagram Protocol (UDP). The details of those protocols are not presented here, since they are well known in the technical field of data communications.

Host and network adapter configurations proposed in the present invention are classified into two types in terms of implementation methods for sharing the various protocol functions described above. FIG. 1(B) shows a first type of implementation where the host takes charge of functions of the transport layer and above, while the network adapter is intelligent enough to provide the internet layer and below. In other words, the network adapter functions as a router, which maintains both IP and MAC addresses at hand.

In contrast to FIG. 1(B), FIG. 1(C) proposes a second type of implementation where the network adapter only takes charge of the lowest layer, the network interface layer, and most protocol functions are provided by the host. If this is the case, the host manages the network table to provide the association between IP and MAC addresses.

Figure 2:
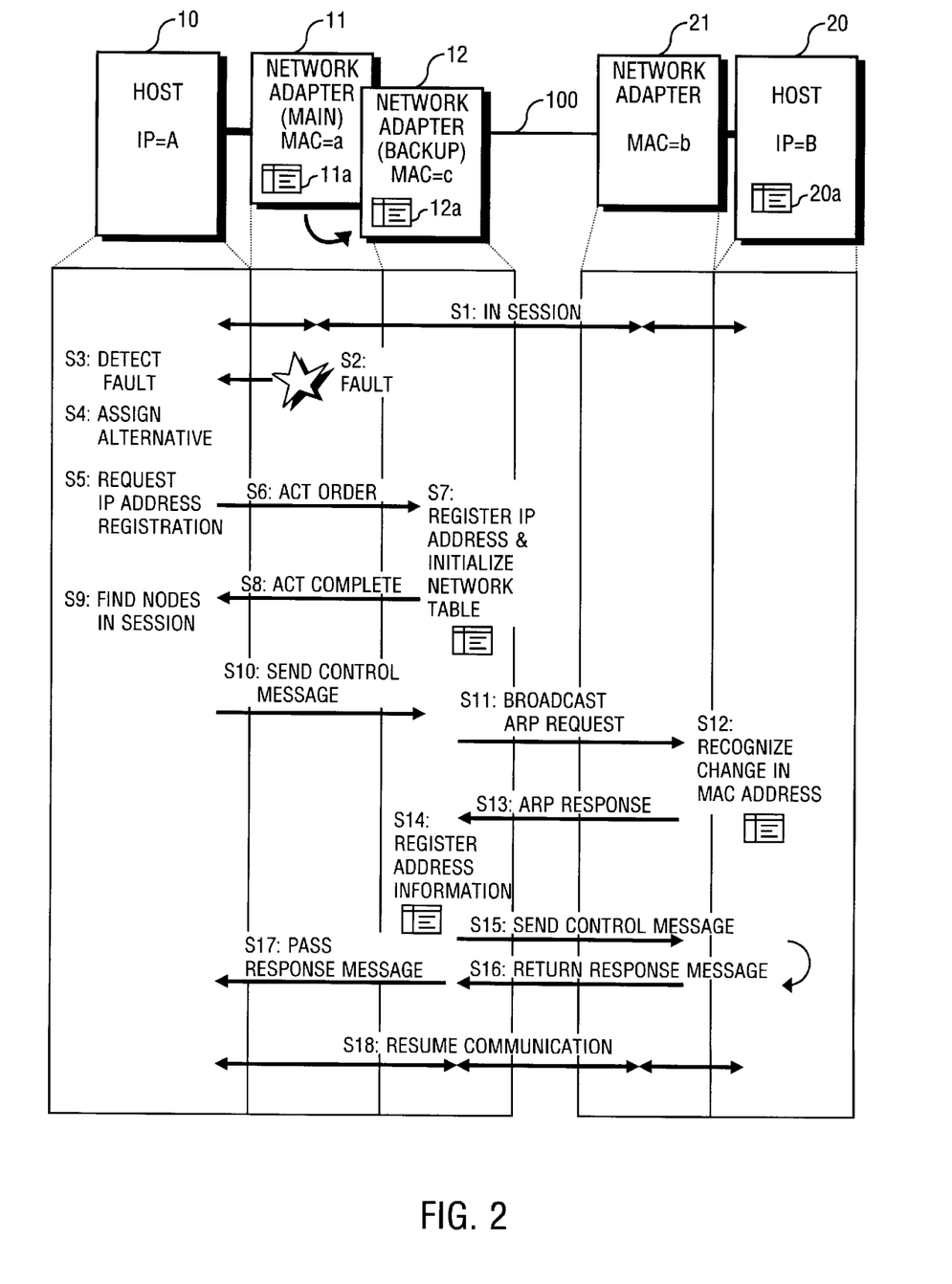
FIG. 2 is a sequence diagram which shows the principle of operation of the first embodiment of the present invention.
Figure 3:
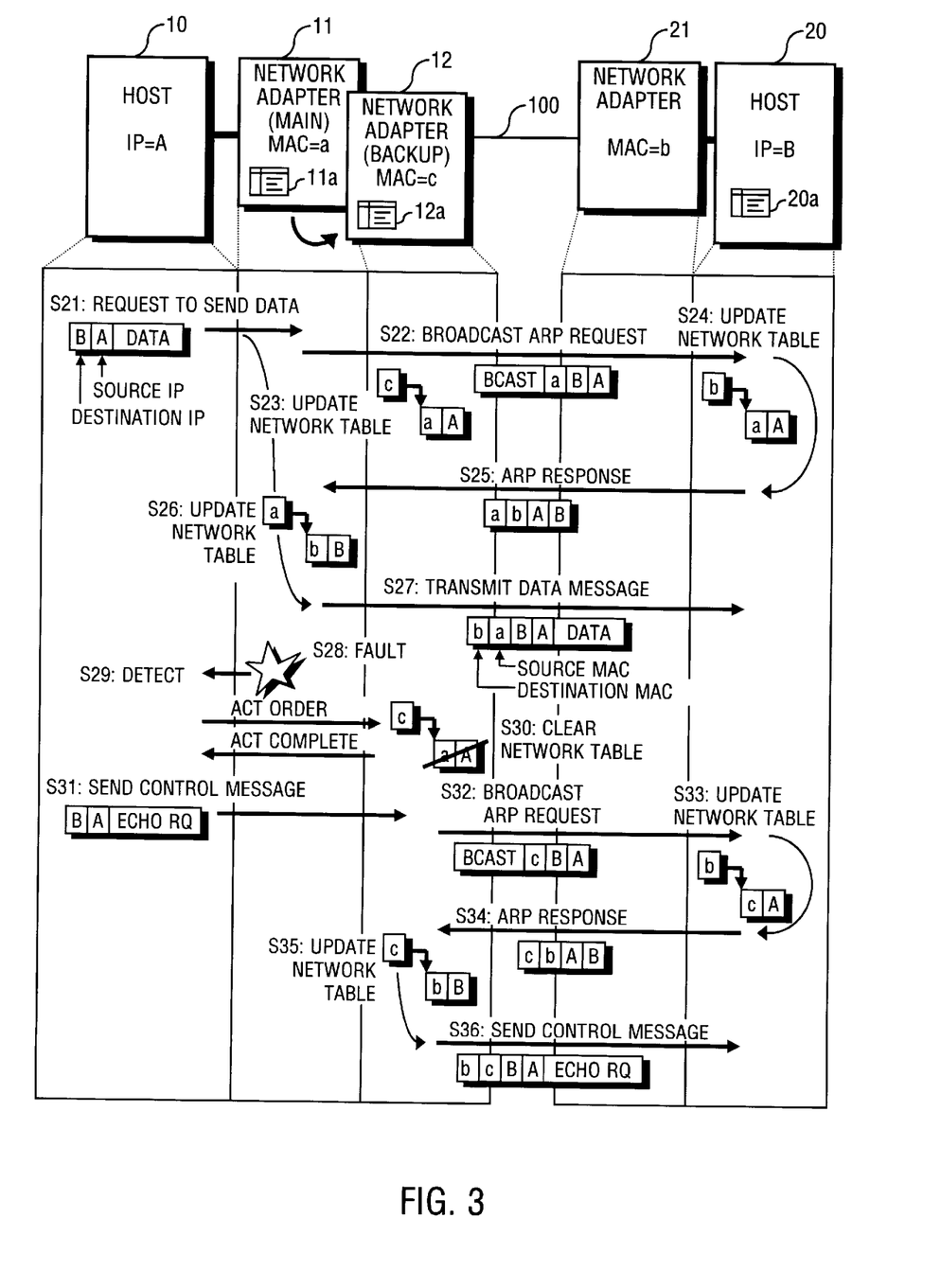
FIG. 3 is a sequence diagram which shows detailed operations of the first embodiment of the present invention.

A first embodiment of the present invention relates to a method of switching between duplicated network adapters that are configured in accordance with the first type of implementation shown in FIG. 1(B). FIGS. 2 and 3 are devoted to the first embodiment. In contrast to this, a second embodiment of the present invention relates to a method of switching between duplicated network adapters that are configured in accordance with the second type of implementation shown in FIG. 1(C). The second embodiment will be described later on, with reference to FIGS. 4 and 5.

FIG. 2 is a sequence diagram which shows the principle of operation of the first embodiment of the present invention. Similarly to FIG. 7, two hosts 10 and 20 are interconnected by a local area network 100 via their respective network adapters 11, 12, and 21. The network adapters 11 and 12 maintain the association between IP and MAC addresses with their respective network tables 11a and 12a, as mentioned earlier. At the opposite end of the network 100, however, a network table 20a is under the control of the host 20 as in the configuration of FIG. 8. Practically, the operation of the first embodiment does not depend on how the TCP/IP protocol stack is implemented in the host 20 and network adapter 21.

In the above-described arrangement of the first embodiment, the host 10 solves a failure of the main network adapter 11 in the following manner.

(S1) The host 10 is now in session with the host 20 by using the main network adapter 11.

(S2) Suppose here that the network adapter 11 has encountered a problem.

(S3) The host 10 detects the failure of the network adapter 11.

(S4) The host 10 assigns the network adapter 12 prepared for backup as an alternative to the failed network adapter 11.

(S5) The host 10 requests registration of the IP address.

(S6) The host 10 sends an activation order (ACT ORDER) to the network adapter 12 which has been selected as the alternative device.

(S7) In response to the activation order, the network adapter 12 clears out its network table 12a and registers the host IP address.

(S8) The network adapter 12 returns an activation complete (ACT COMPLETE) message to the host 10.

(S9) The host 10 investigates what other hosts or routers on the same network are in session. More specifically, the host 10 extracts every node to which the host 10 has established a TCP connection, by referring to its internal management table.

(S10) In an attempt to transmit a predetermined control message to the nodes found in step S9 (e.g., the host 20), the host 10 sends a message transmission request to the activated network adapter 12. Preferably, this control message is an echo request message defined in the ICMP protocol. In this standard protocol, an echo request message tests whether a destination is reachable and responding. The destination, if alive, should reply to the request message by returning an echo response message.

(S11) Since the network table 12a has been cleared, the network adapter 12 broadcasts an ARP request message upon receipt of the message transmission request from the host 10.

(S12) The network adapter 21 receives the ARP request message. With this message, the host 20 recognizes that the MAC address of the host 10 was changed, and thus registers the new address pair to its own network table 20a.

(S13) The host 20 returns an ARP response message via the network adapter 21 to inform the host 10 of its MAC address "b."

(S14) Upon receipt of this ARP response message, the network adapter 12 registers the address information contained in the message to its network table 12a.

(S15) The network adapter 12 transmits the control message to the host 20 by using the registered address information.

(S16) The network adapter 21 returns a response message to the host 10 in response to the control message.

(S17) The response message received by the network adapter 12 is passed to the host 10.

(S18) Now that all necessary address information for the communication between the hosts 10 and 20 has been updated, the two hosts can resume the communication through the network adapter 12 switched from the failed network adapter 11.

As described above, when the main network adapter 11 has failed, the above-described procedure immediately updates the network tables after switching the operations to the backup network adapter 12, thus enabling the host 10 to continue the data communication. The proposed switching system completely eliminates the 20-minute latency time required in the conventional systems before the new configuration becomes effective.

FIG. 3 is a sequence diagram which shows the detailed operation of the first embodiment outlined in FIG. 2, particularly for steps S1 to S15. To provide further details, the sequence of FIG. 3 assumes the following MAC and IP addresses:

A: IP address of the host 10

B: IP address of the host 20 a: MAC address of the main network adapter 11 c: MAC address of the backup network adapter 12 b: MAC address of the network adapter 21 attached to the host 20

In FIG. 3, the main network adapter 11 is switched to the other adapter 12 according to the following steps.

(S21) The network adapter 11 is now working properly as the main network adapter. Suppose here that the host 10 has requested a transmission of the following data message addressed to the host 20.

"(B) (A) (DATA)"

Here, the first field "(B)" represents the IP address of the host 20, the second field "(A)" the source IP address, and the third field "(DATA)" the transmission data.

(S22) At this stage, the MAC address corresponding to the destination IP address "B" is not available in the network table 11a of the network adapter 11. Accordingly, the network adapter 11 suspends the transmission of the data message for a while and, instead, transmits an ARP request message having the following fields to all nodes on the network to investigate the MAC address of the destination.

"(BCAST) (a) (B) (A)"

Here, the first field "(BCAST)" represents a code used to call up all MAC addresses simultaneously, or broadcast the same message toward every node on the network. The second field "(a)" shows the source MAC address, indicative of the main network adapter 11 that is currently working. The third and fourth fields represent the destination IP address and source IP address, respectively.

(S23) The backup network adapter 12 is designed to receive broadcast messages, even when it is in a standby state, and to acquire information about network addresses assignment, if any. Therefore, the network adapter 12 takes in the ARP request message submitted in step S22, and enters the acquired address information into its own network table 12a. More specifically, a new table entry that associates the IP address "A" with the MAC address "a" is registered in the network table 12a. This entry is represented as (c|a:A), where the first term "c" means that the owner of the network table 12a has a MAC address "c," and the second and third terms "a" and "A" represent a pair of MAC and IP addresses that have been received and registered.

(S24) The ARP request message transmitted in step S22 arrives at the network adapter 21 and is passed to the host 20. The host 20 registers a new entry (b|a:A) to its own network table 20a, which associates the MAC address "(a)" with the IP address "A" of the host 10.

(S25) The host 20 recognizes that the ARP request message is destined for itself, and replies to the request by returning an ARP response message to the host 10 via the network adapter 21. The ARP response message contains the MAC address "b" in question.

(S26) Upon receipt of the ARP response message, the network adapter 11 registers an entry (a|b:B) to its own network table 11a, which indicates the association between the MAC address "b" and IP address "B" of the host 20.

(S27) Now that the destination MAC address of the host 20 is available in the network table 11a, the network adapter 11 executes transmission of the data message that has been suspended since step S22. The message is assembled with the IP and MAC addresses as "(b) (a) (B) (A) (DATA)", where the first field "(b)" shows the destination MAC address, the second field "(a)" the source MAC address, the third field "(B)" the destination IP address, the fourth field "(A)" the source IP address, and the fifth field "(DATA)" the transmission data.

(S28) It is now assumed that a fault has happened to the main network adapter 11.

(S29) Upon detection of the fault of the network adapter 11, the host 10 invokes a process to switch the operations to the backup network adapter 12.

(S30) The host 10 sends an activation order to the network adapter 12 that has been in standby mode. In response to this order, the network adapter 12 returns an activation complete message (ACT COMPLETE) to the host 10 after initializing its network table 12a. As such, the failed network adapter 11 is replaced with the backup network adapter 12.

(S31) The host 10 requests the network adapter 12 to transmit the following control message to the host 20.

"(B) (A) (ECHO REQ)"

This control message is known as an echo request message defined in the ICMP protocol, whose original purpose is to test whether a destination is reachable and responding or not.

(S32) As the network table 12a in the network adapter 12 has been cleared in step S30, the MAC address corresponding to the destination IP address is not available in the sending end. Therefore, the network adapter 12 broadcasts the following ARP request message over the network.

"(BCAST) (c) (B) (A)"

(S33) Having received the ARP request message transmitted in step S32, the host 20 updates the entry concerning the IP address "A" in the network table 20a. As a result, the old table entry (b|a:A) is changed to (b|c:A) indicative of the new address pair.

(S34) The network adapter 21 returns an ARP response message to the network adapter 12 to answer that the MAC address in question is "b."

"(c) (b) (A) (B)"

(S35) Upon receipt of the ARP response message, the network adapter 12 registers an entry (c|b:B), indicative of the address pair of the host 20, to the network table 12a.

(S36) The network adapter 12 transmits the ICMP echo request message, which has been in a pending state since step S32, to the host 20 by using the relevant address information registered in the network table 12a.

"(b) (c) (B) (A) (ECHO RQ)"

Here, the first field "(b)" is the destination MAC address of the network adapter 21. The second field "(c)" indicates the source MAC address indicative of the network adapter 12. The third field "(B)" represents the destination IP address of the host 20, the fourth field "(A)" the source IP address of the host 10, and the fifth field "(ECHO RQ)" the transmission data. Note that the source MAC address has changed from "a" to "c" in comparison with the value in step S27. This shows that the network adapter of the host 10 has been successfully switched to the backup network adapter 12.

In the way described above, when the main network adapter 11 has failed, the proposed system immediately switches the operations to the other network adapter 12 reserved for backup purposes, thus enabling the host 10 to continue the data communication with other hosts.

Now, the next section describes a second embodiment of the present invention. The second embodiment is distinguishable from the first embodiment in that the network adapters 11 and 12 of the host 10 only provide the lowest layer functions of TCP/IP protocols as FIG. 1(C) shows. In this structural arrangement, the host 10 holds a network table 10a to manage the association between IP addresses and MAC addresses.

Figure 4:
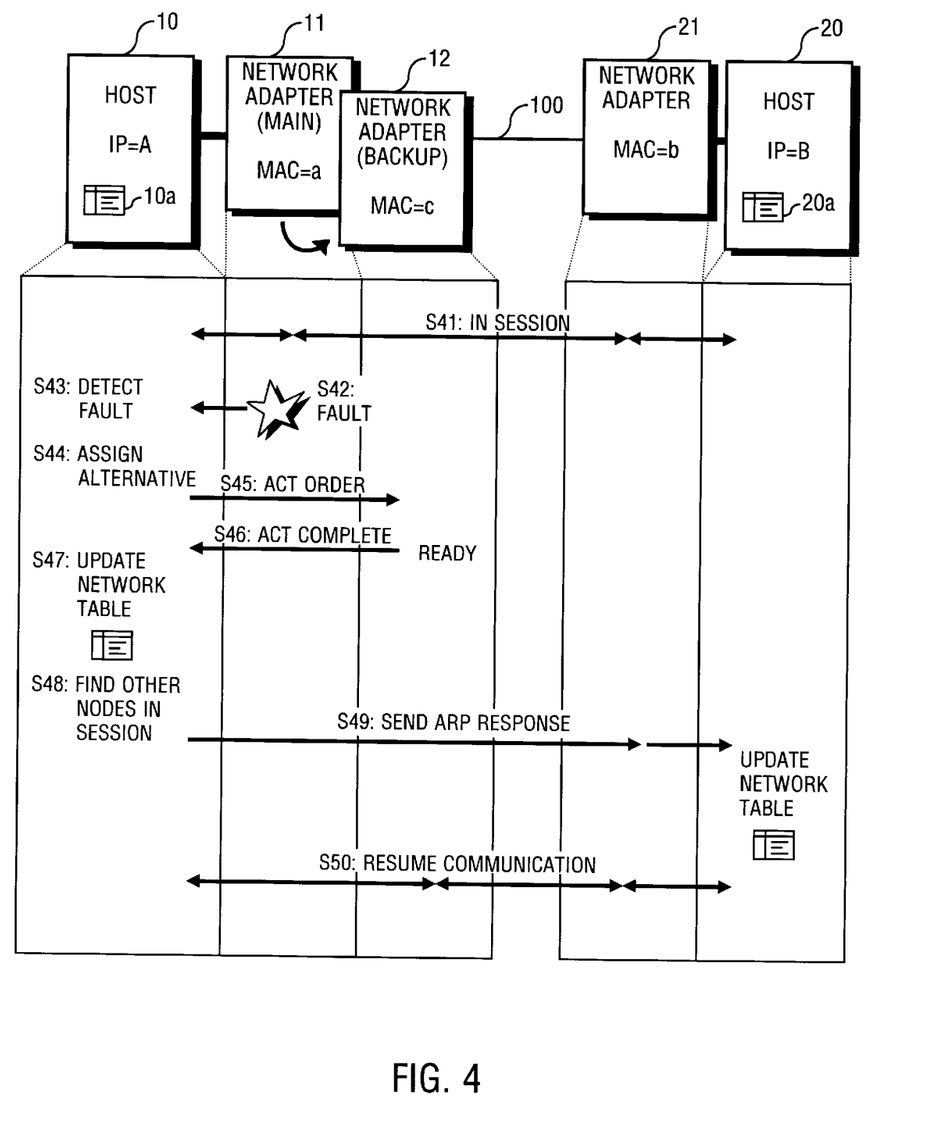
FIG. 4 is a sequence diagram which shows the principle of operation of the second embodiment of the present invention.

FIG. 4 is a sequence diagram which shows the principle of operation of the second embodiment. The hosts 10 and 20 communicate with each other according to the following steps.

(S41) The host 10 is now in session with the host 20 by using the main network adapter 11.

(S42) It is assumed that the network adapter 11 has encountered a trouble.

(S43) The failure of the network adapter 11 is detected by the host 10.

(S44) The host 10 assigns the backup network adapter 12 as an alternative to the failed network adapter 11.

(S45) The host 10 sends an activation order message (ACT ORDER) to the network adapter 12 which has been nominated as the alternative.

(S46) The network adapter 12 returns an activation complete message (ACT COMPLETE) to the host 10 to indicates that it is now ready to operate as a peripheral of the host 10.

(S47) Upon receipt of the activation complete message, the host 10 updates its network table 10*a* to change the MAC address value from "a" to "c."

(S48) The host 10 investigates which hosts (and/or routers) on the same network are in session with itself. More specifically, the host 10 refers to its internal management table to find every node to which the host 10 has set up a TCP connection.

(S49) To promote the renewal of the other nodes' network tables, the host 10 transmits an ARP response message to them. This ARP response message arrives at the network adapter 21, for example. The network adapter 21 updates the network table entry concerning the host 10 by entering a new correspondence (b|c:A) between the IP address of the host 10 and the MAC address of the network adapter 12.

(S50) Now that all necessary address information for the communication between the hosts 10 and 20 has been updated, the two hosts resume the session via the network adapter 12 switched from failed the network adapter.

The above-described procedure reacts to a fault of the network adapter 11 by immediately updating the network tables after switching operations to the network adapter 12 that has been reserved for backup purposes, thereby enabling the host 10 to continue the ongoing data communication without interrupt. The proposed switching system completely eliminates the 20-minute latency time that the conventional systems require before the new adapter configuration becomes effective. Because the host 10 controls the upper layer of TCP/IP in the second embodiment, the ARP response message can be transmitted immediately after switching of the network adapters, without using ICMP echo request messages.

Figure 5:
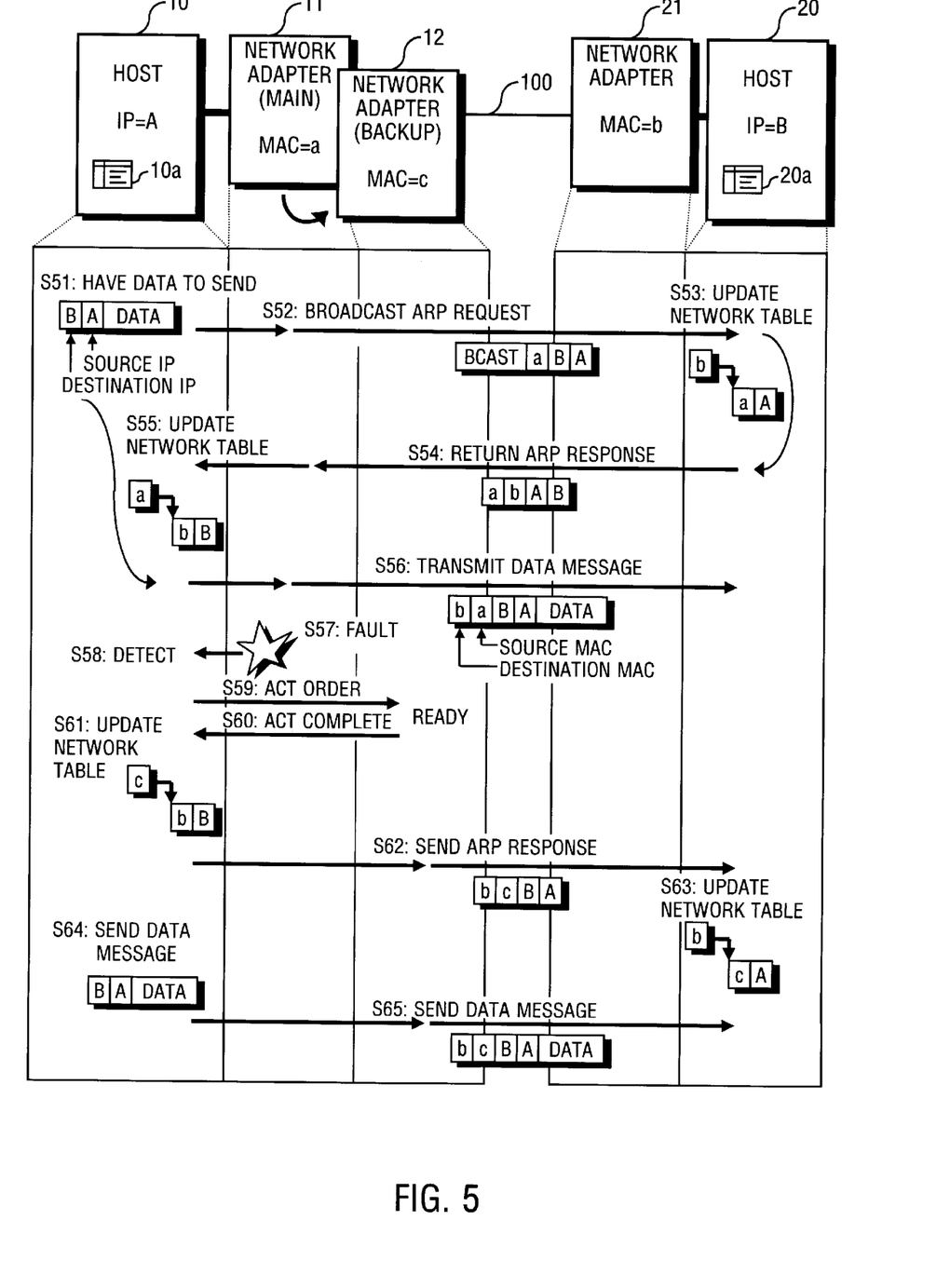
FIG. 5 is a sequence diagram which shows detailed operations of the second embodiment of the present invention.

FIG. 5 is a sequence diagram which shows the detailed operations of the second embodiment. To provide further details of the sequence described in FIG. 4, the following explanation assigns specific address values to hosts and network adapters as in the first embodiment.

(S51) The network adapter 11 is now working properly as the main network adapter of the host 10. Suppose that the host 10 is attempting to make a transmission of the following data message addressed to the host 20.

"(B) (A) (DATA)"

(S52) At this stage, the MAC address corresponding to the destination IP address "B" is not available in the network table 10*a* of the host 10. Accordingly, the host 10 suspends the transmission of the message for a while and, instead, transmits an ARP request message having the following format to all nodes on the network to investigate the MAC address of the destination.

"(BCAST) (a) (B) (A)"

(S53) The ARP request message reaches the network adapter 21 and is passed to the host 20. The host 20 registers a new entry (b|a:A) to its own network table 20*a*, which associates the MAC address "a" with the IP address "A" of the host 10.

(S54) The host 20 recognizes that the ARP request message is destined for itself, and replies to the request by returning an ARP response message to the host 10 via the network adapter 21.

"(a) (b) (A) (B)"

(S55) The network adapter 11 receives the ARP response message sent from the host 20 and passes it to the host 10. The host 10 registers a new entry (a|b:B) to its network table 10*a*, which indicates the association between the MAC address "b" and IP address "B" of the host 20.

(S56) Now that the destination MAC address is available in the network table 10*a*, the host 10 executes the message transmission that has been suspended since step S52.

"(b) (a) (B) (A) (DATA)"

(S57) It is now assumed that a trouble has happened to the main network adapter 11.

(S58) The host 10 detects the failure of the network adapter 11.

(S59) The host 10 sends an activation order (ACT ORDER) to the backup network adapter 12 that has been in standby mode.

(S60) The network adapter 12 indicates its readiness to the host 10 by sending back an activation completion message (ACT COMPLETE).

(S61) The host 10 updates its own network table 10*a* by changing the entries from (a|b:B) to (c|b:B), for example, to be suitable for the backup network adapter 12.

(S62) To notify the host 20 that its MAC address has changed from "a" to "c," the host 10 transmits the following ARP response message.

"(b) (c) (B) (A)"

(S63) The ARP response message reaches the network adapter 21 and is passed to the host 20. The host 20 updates its own network table 20*a* by changing the relevant entry (b|a:A) to (b|c:A).

(S64) The host 10 now intends to send the following data message to the host 20.

"(B) (A) (DATA)"

(S65) The network adapter 12 assembles the following data message in response to the request, and transmits it to the host 20.

"(b) (c) (B) (A) (DATA)"

As described above, the host 10 responds to a fault of the network adapter 11 by immediately sending an ARP response message to make other nodes update their respective network tables, as well as switching the operations to the network adapter 12 that has been reserved for backup purposes. This enables the ongoing data communication to be continued without disruption.

Figure 6:
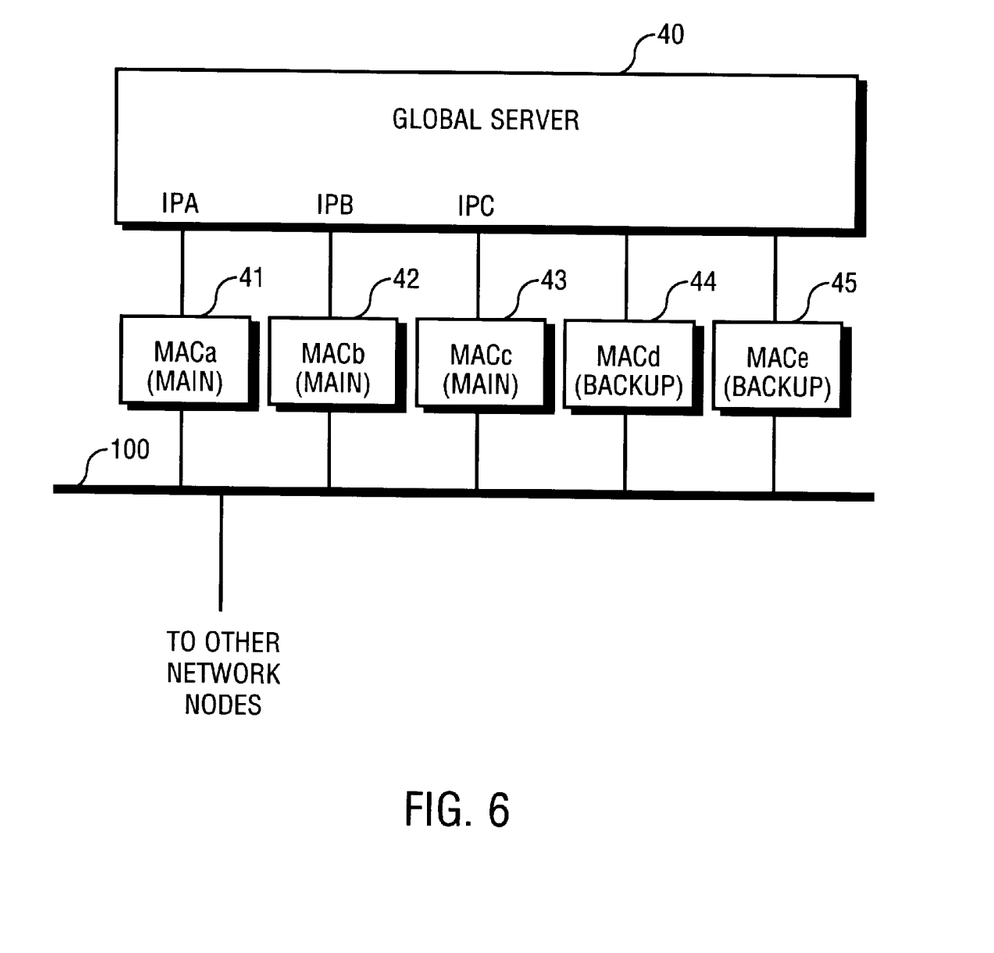
FIG. 6 is a diagram which shows the configuration of a third embodiment of the present invention.

Referring to FIG. 6, the next section will describe a third embodiment of the present invention.

FIG. 6 illustrates a network 100, to which a global server 40 is connected via a plurality of network adapters 41 to 45. These network adapters organize a multiple-backup hot standby system, as well as sharing a large amount of communication workloads of the global server 40. More specifically, five different MAC addresses "MACa" to "MACe" are assigned to the network adapters 40*a* to 40*e*, while three IP addresses "IPA," "IPB," and "IPC" are assigned to the network adapters 41, 42, and 43, respectively. The remaining network adapters 44 and 45 are reserved as backup devices.

In case that any one of the three main network adapters 41 to 43 has encountered a problem, the global server 40 determines an alternative to the failed network adapter by selecting either one of the backup network adapters 44 and 45. When the network adapters support the internet layer and below as shown in FIG. 1(B), the global server 40 sets the same IP address as that of the failed adapter to a backup network adapter, clears the network table, and directs the backup network adapter to send an ARP request to other nodes on the network. Since this ARP request updates every network table in other nodes, the global server 40 can promptly restart the ongoing communication with a new network adapter. On the other hand, when the network layer software is implemented in the host side as in FIG. 1(C), the global server 40 directly initializes the network table and sends ARP response messages to every node on the network. Since the ARP response messages update every network table in other nodes, the global server 40 can promptly restart the communication through the new network adapter. Such a structural arrangement of FIG. 6 is suitable for so-called global server equipment where high communication throughputs and high reliability are particularly important.

The above discussion will be summarized below. According to the present invention, a host having duplex network adapters is configured to disconnect a failed network adapter and activate another network adapter, when a fault has been detected. At the same time, the host initializes the network table in the new network adapter and makes it send an ARP request message to other hosts on the network. The address information contained in an ARP response is registered in the network table and used for further communication activities. In this way, the present invention makes it possible to automatically switch between duplicated network adapters to provide quick recovery from failure without disrupting ongoing host-to-host communications based on the TCP/IP protocol.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A method of switching from a first network adapter, having a first physical address, to a second network adapter, having a second physical address, to provide a first host, having a first logical address with duplicated functionality for TCP/IP communications with a plurality of hosts including a second host over a network, the method comprising the steps of:

(a) disconnecting the first network adapter when a fault of the first network adapter has been detected by the first host;

(b) activating the second network adapter and initializing a network table stored therein;

(c) initiating a transmission of a control message from the first host to the second host;

(d) as a result of the control message initiated at step (c), broadcasting an ARP request message from the second network adapter to the hosts on the network, thereby causing the second host to update a network table thereof so that the first logical address is associated with the second physical address;

(f) transmitting the control message from the second network adapter to the second host by using address information contained in an ARP response message received from the second host;

(g) receiving a response message from the second host in reply to the control message; and (h) recognizing the reception of the response message as completion of the response of switching from the first network adapter to the second network adapter.

2. The method according to claim 1, wherein the first host provides communication protocols of transport layer, and the first and second network adapters provide communication protocols of internet and lower layers.

3. The method according to claim 1, wherein the control message initiated in said step (c) is an echo request message defined in Internet Control Message Protocol (ICMP).

4. The method according to claim 1, wherein said step (b) includes initialization of a network table of the second network adapter.

5. A method of switching from a first network adapter, having a first physical address, to a second network adapter, having a second physical address, to provide a first host, having a first logical address, with duplicated functionality for TCP/IP communications with a plurality of other hosts including a second host over a network, the method comprising the steps of:

(a) disconnecting the first network adapter when a fault of the first network adapter has been detected by the host;

(b) activating the second network adapter; and (c) sending an ARP response message from the first host to the second host via the second network adapter, thereby causing the second host to update a network table thereof so that the first logical address is associated with the second physical address.

6. The method according to claim 5, wherein the first host provides communication protocols of internet layer, and the first and second network adapters provide communication protocols of network interface layer.

7. The method according to claim 5, wherein the ARP response message sent in said step (c) includes an IP address of the first host and a MAC address of the second network adapter both encoded in a source address field thereof.

8. A system for switching from a first network adapter, having a first physical address, to a second network adapter, having a second physical address, to provide a first host, having a first logical address, with duplicated functionality for TCP/IP communications with a plurality of other hosts including a second host over a network, the system comprising:

(a) fault detection means for detecting a fault of the first network adapter;

(b) activation means for disconnecting the first network adapter in response to the fault detected by said fault detection means, and activating the second network adapter as an alternative to the first network adapter;

(c) control message transmission means for initiating a transmission of a control message from the first host to the second host vial the second network adapter activated by said activation means, the control message causing an ARP request to be sent to the second host, thereby making the second host update a network table thereof so that the first logical address is associated with the second physical address; and (d) completion recognizing means for receiving a response message from the second host in reply to the control message sent from said control message transmission means, and recognizing the reception of the response message as completion of a process of switching from the first network adapter to the second network adapter.

9. The system according to claim 8, wherein the second network adapter comprises:

ARP request means for broadcasting an ARP request message in response to the initiation of the control message by said control message transmission means; and transmission means for transmitting the control message to the second host, based on address information contained in the ARP response message received from the second host.

10. The system according to claim 8, wherein the first host provides communication protocols of transport layer, and the first and second network adapters provide communication protocols of internet and lower layers.

11. The system according to claim 8, wherein the control message initiated by said control message transmission means is an echo request message defined in Internet Control Message Protocol.

12. A system for switching from a first network adapter, having a first physical address, to a second network adapter, having a second physical address, to provide a first host, having a first logical address, with duplicated functionality for TCP/IP communications with a plurality of other hosts including a second host over a network, the system comprising:

(a) fault detection means for detecting a fault of the first network adapter;

(b) activation means for disconnecting the first network adapter in response to the fault detected by said fault detection means, and activating the second network adapter as an alternative to the first network adapter; and (c) ARP message transmission means for sending an ARP response message from the first host to the second host via the second network adapter activated by said activation means, thereby making the second host update a network table thereof so that the first logical address be associated with the second physical address.

13. The system according to claim 12, wherein the first host provides communication protocols of internet layer, and the first and second network adapters provide communication protocols of network interface layer.

14. The system according to claim 12, wherein the ARP response message transmitted by said ARP message transmission means includes an IP address of the first host and a MAC address of the second network adapter both encoded in a source address field thereof.

15. The system according to claim 8, wherein the first host comprises three or more network adapters including the first and the second network adapters, two or more of the network adapters, including the first network adapter, are used as main operating network adapters, and the remaining network adapters including the second network adapter are used for backup purposes.

* * * * *